United States Patent [19]

Kashmerick

[11] 4,276,034
[45] Jun. 30, 1981

[54] STERN DRIVE GEAR BOX AND CLUTCHING ARRANGEMENT

[75] Inventor: Gerald E. Kashmerick, Lindenhurst, Ill.

[73] Assignee: Outboard Marine Corporation, Waukegan, Ill.

[21] Appl. No.: 34,191

[22] Filed: Apr. 27, 1979

[51] Int. Cl.³ .................. B63H 1/14; B63H 5/06
[52] U.S. Cl. .................. 440/75; 440/53; 74/378
[58] Field of Search .......... 115/41 R, 41 HT, 34 R, 115/35, 17, 18 R; 74/322–324, 330, 355, 361, 720.5, 376–379, 391, 404, 417; 440/49, 53, 55–65, 75, 76–78

[56] References Cited

U.S. PATENT DOCUMENTS

| | | | |
|---|---|---|---|
| 3,182,629 | 5/1965 | Armantrout | 115/34 R |
| 3,530,741 | 9/1970 | Charest | 74/720.5 |
| 3,847,108 | 11/1974 | Shimanckas | 74/378 |
| 4,037,558 | 7/1977 | Nossiter | 115/41 HT |

Primary Examiner—Trygve M. Blix
Assistant Examiner—D. W. Keen
Attorney, Agent, or Firm—Michael, Best & Friedrich

[57] ABSTRACT

Disclosed herein is a stern drive unit including a stationary housing adapted to be fixed relative to a boat hull and a movable housing mounted on the stationary housing for pivotal movement about a tilt axis which is substantially horizontal when the stationary housing is fixed to the boat hull. The stern drive unit also includes a propulsion leg including a rotatably mounted propeller, an input shaft in the stationary housing transverse to the tilt axis, and an output shaft journaled in the movable housing and having an axis transverse to the tilt axis, generally intersecting the tilt axis, and connected to the propeller. The stern drive unit also includes a reversing transmission connected to the input and output shafts for selectively controlling operation of the propeller, the reversing transmission including a transfer gear supported for rotation coaxially with the tilt axis, spaced bevel gears mounted for rotation coaxially with the transfer gear, a first clutch pack for selectively connecting and disconnecting the transfer gear to one of the bevel gears, and a second clutch pack for selectively connecting and disconnecting the transfer gear to the other of the bevel gears. The stern drive unit further includes a first gear mounted on one of the input shaft and the output shaft in mesh with the transfer gear, and a second gear mounted on the other of the input shaft and the output shaft and in mesh with both of the spaced bevel gears.

16 Claims, 3 Drawing Figures

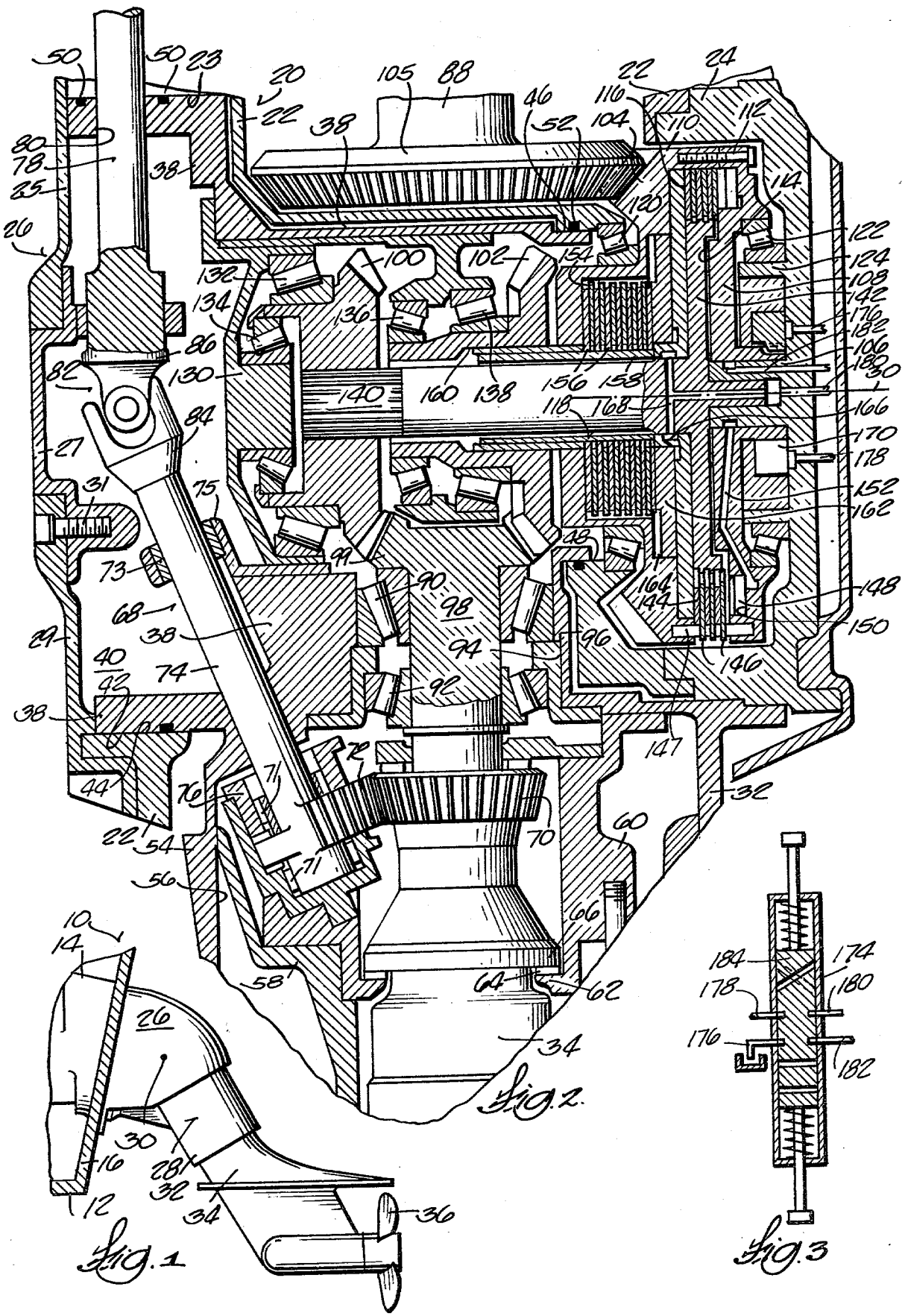

ced in the movable housing, an output shaft journaled in

STERN DRIVE GEAR BOX AND CLUTCHING ARRANGEMENT

BACKGROUND OF THE INVENTION

The invention relates to stern drive units which are adapted to be fixed relative to a boat hull and more particularly to transmissions for use in the power train of stern drive units for coupling engine output to a propeller, and which will accomodate tilting and trimming of the propeller with respect to the boat hull and engine.

Stern drive units are well known and include varied transmission mechanisms. Examples of stern drive units are shown in the U.S. Kroll Pat. No. 3,977,356 issued Aug. 31, 1976, and in the U.S. Shimanckas Pat. No. 3,847,108, issued Nov. 12, 1974, both of those patents being assigned to the assignee of the present invention.

Attention is also directed to the U.S. Nossiter Pat. No. 4,037,558 issued July 26, 1977, and the U.S. Armantrout et al. Pat. No. 3,182,629, issued May 11, 1965.

Other stern drive units are shown in the U.S. Warburton Pat. No. 3,217,688, issued Nov. 16, 1965, the U.S. Shimanckas Pat. No. 3,183,880, issued May 18, 1965, the U.S. Morse Pat. No. 3,146,755, issued Sept. 1, 1964, the U.S. Nossiter Pat. No. 3,826,219, issued July 30, 1974, and the U.S. Bergotedt Pat. No. 3,857,357, issued Dec. 31, 1974.

SUMMARY OF THE INVENTION

The invention includes a stern drive unit having a stationary housing adapted to be fixed relative to a boat hull, a movable housing, and means for mounting the movable housing on the stationary housing for pivotal movement about a tilt axis which is substantially horizontal when the stationary housing is fixed to the boat hull. The stern drive unit further includes a propulsion leg including a rotatably mounted propeller, an input shaft in the stationary housing transverse to the tilt axis, an output shaft journaled in the movable housing, having an axis transverse to the tilt axis, and connected to the propeller, and a reversing transmission connected to the input and output shafts for selectively controlling operation of the propeller. The reversing transmission includes a transfer gear supported for rotation coaxially with the tilt axis, spaced bevel gears mounted for rotation coaxially with the transfer gear, and means for alternatively and selectively connecting the transfer gear to the bevel gears for rotation with the transfer gear, the connecting means including a first clutch pack for selectively connecting and disconnecting the transfer gear to one of the bevel gears and a second clutch pack for selectively connecting and disconnecting the transfer gear to the other of the bevel gears. The transmission also includes a first gear mounted on one of the input shaft and the output shaft in mesh with the transfer gear, and a second gear mounted on the other of the input shaft and the output shaft and in mesh with both of the spaced bevel gears.

One of the principal features of the invention is the provision of a transfer gear including a chamber therein and wherein at least one [the] clutch pack is disposed in the chamber in axially aligned relation with respect to the tilt axis.

Another of the principal features of the invention is the provision in the reversing transmission of a transfer shaft supported for rotation coaxially with the tilt axis by the housing, wherein one of the bevel gears is fixed on the transfer shaft for rotation with the transfer shaft, wherein the first clutch pack includes at least one clutch plate mounted in the chamber for rotation about the axis with the transfer gear and a second clutch plate mounted on the transfer shaft for rotation with the transfer shaft, the first and second clutch plates being located in adjacent relation, and wherein the means for selectively and alternatively connecting the bevel gears to the transfer gear includes means for selectively forcing the clutch plates into engagement for causing rotation of the transfer shaft and the one bevel gear with the transfer gear.

Another of the principal features of the invention is the provision in the transfer gear of a cavity therein, the cavity including a first cylindrical cavity portion housing one of the clutch packs and a second cylindrical cavity portion spaced axially from the first cylindrical cavity portion and housing the other of the clutch packs, and the provision in the means for connecting the bevel gears to the transfer gear of pistons housed within the cavity and selectively engageable with the clutch packs.

Another of the principal features of the invention is the provision in the reversing transmission of a fluid pump located in the stationary housing and driven by the transfer gear.

Another of the principal features of the invention is the provision in the stern drive unit of a stationary housing which includes means for supporting the transfer gear for rotation about the tilt axis, and of a movable housing including means for supporting the bevel gears for rotation in coaxial alignment with the transfer gear.

Another of the principal features of the invention is the provision in the stern drive unit of a stationary housing including a central bore supporting at least a portion of the movable housing therein for pivotal movement about the tilt axis, the portion of the movable housing including a central bore therein housing the bevel gears, and the provision of first bearing means located in the central bore of the stationary housing and supported by the stationary housing for supporting the transfer gear in the stationary housing central bore for rotation about the tilt axis, and second bearing means supported by the movable housing and located in the movable housing central bore for supporting the bevel gears for rotation about the tilt axis.

The invention further includes a stern drive unit including a stationary housing adapted to be fixed to a boat hull, a movable housing, and means mounting the movable housing on the stationary housing for pivotal movement about a tilt axis which is substantially horizontal when the stationary housing is fixed relative to the boat hull. The stern drive unit also includes a power transfer shaft supported for rotation coaxially with respect to the tilt axis, a transfer gear supported for rotation about the tilt axis, and spaced opposed bevel gears fixed for rotation coaxially with the tilt axis, one of the bevel gears being mounted on the transfer shaft for common rotation therewith, and the other of the bevel gears being mounted for rotation coaxially with respect to the transfer shaft. The stern drive unit further includes means for alternatively and selectively connecting the transfer gear to the other of the bevel gears and to the transfer shaft for rotation therewith, an input shaft in the stationary housing and extending transversely to the transfer shaft, an output shaft journaled in the movable housing and having an axis and located in a plane transverse to the tilt axis and intersecting the tilt axis, a first gear mounted on one of the input shaft and the output shaft and in mesh with the transfer gear, and a second gear mounted on the other of the input shaft and the output shaft in mesh with both of the spaced bevel gears.

One of the principal features of the invention is the provision in the stern drive unit of a transfer gear supported for rotation about the tilt axis and including a chamber therein including a first cylindrical chamber portion and a second cylindrical chamber portion, and the provision in the means for alternatively and selectively connecting the transfer gear of a first clutch pack housed in the first cylindrical chamber portion for selectively connecting the transfer shaft to the transfer gear and a second clutch pack housed in the second cylindrical chamber portion for selectively connecting the one of the bevel gears to the transfer gear.

Another of the principal features of the invention is the provision in the first clutch pack of at least one clutch plate supported for rotation with the transfer gear about the tilt axis and a second clutch plate mounted for rotation with the transfer shaft, the first and second clutch plates being located in adjacent relation, the provision in the means for alternately and selectively connecting the transfer gear of means for alternatively and selectively forcing the clutch plates into frictional engagement, the provision in the second clutch pack of at least one clutch plate supported for rotation about the tilt axis with the transfer gear and a second clutch plate mounted for rotation with one bevel gear, the first and second clutch plates of the second clutch pack being located in adjacent relation, and the provision in the means for alternately and selectively connecting the transfer gear of means for forcing the first and second clutch plates of the second clutch pack into frictional engagement.

Various other features and advantages of the invention are set forth in the following description, in the claims, and in the drawings.

BRIEF DESCRIPTION OF THE DRAWINGS

FIG. 1 is a fragmentary side elevation view of a boat mounted stern drive unit which incorporates various of the features of the invention.

FIG. 2 is an enlarged top view, shown in section and with parts broken away and omitted, of a portion of the stern drive unit shown in FIG. 1, and with the output shaft in an elevated or generally horizontal condition.

FIG. 3 is a schematic view of a valve employed with the stern drive unit shown in FIG. 1.

Before describing at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in FIG. 1 is a stern drive unit which is adapted to be fixed relative to the transom of a boat hull 12 and drivingly connected to an internal combustion engine (not shown).

In general, the stern drive unit 10 comprises a support 14 which can be fixed relative to the boat hull 12 in any desired manner. For instance, the support 14 could be secured directly to a boat transom 16 or could be secured to the boat hull independently of the transom 16. Although the support 14 is designed to extend through a hole in the transom 16, in the specifically disclosed construction, it is contemplated to mount the support 14 to the boat hull 12 independently of the transom 16.

While other constructions can be employed, in the construction specifically illustrated, the support 14 includes a stationary housing 20 (FIG. 2). The stationary housing 20 is comprised of a housing portion 22 forming a large stepped cylindrical bore or cavity 23 therein, the bore 23 being open at its opposite ends. The stationary housing 20 also includes a coverplate 24 fixedly joined to the stepped cylindrical housing portion 22 and closing one of the ends of the bore 23. The stationary housing 20 is encased or enclosed in a cover assembly 26 which is bolted or otherwise fixed to the housing 20 and which includes a plurality of cover members 25, 27, and 29 respectively bolted together by bolts 31. As shown in FIG. 2, the cover assembly 26 surrounds the sides of the stationary housing 20 and closes the end of the stepped bore 23 opposite the cover plate 24.

Mounted on the support 14 is a propulsion unit 28 (FIG. 1) which is connected to the support 14 by means affording vertical swinging movement of the propulsion unit 28 about a generally horizontal tilt axis 30. The propulsion unit 28 generally includes a movable housing 32 and a lower propulsion or steering leg 34 which includes a propeller 36 and which is connected to the movable housing 32 by means affording steering movement of the propulsion leg 34 relative to the movable housing 32 about an axis transverse to the tilt axis 30. While various constructions can be employed for supporting the movable housing 32 for vertical swinging movement about the tilt axis 30, in the illustrated construction, the movable housing 32 includes a trunnion portion 38 at its upper end, the trunnion portion 38 being housed within the stepped cylindrical bore 23 for pivotal movement therein about the tilt axis 30. More specifically, the trunnion portion 38 forms a hollow stepped cylindrical casing having a central cavity 40 and including an outer cylindrical bearing surface 42 at one axial end, the bearing surface 42 being supported by a cylindrical inner bearing surface 44 of the stationary housing 20, the bearing surface 44 being a portion of the stepped cylindrical bore 23. The opposite end of the trunnion portion 38 also defines an outer cylindrical bearing surface 46 supported by a complementary bearing surface 48 of the stationary housing 20. A fluid-tight seal is maintained between the bearing surfaces 42 and 44 by seals 50, and a similar fluid-tight seal is maintained between the bearing surfaces 46 and 48 by a seal 52.

The movable housing 32 also includes a generally downwardly extending hollow cylindrical drive shaft housing portion 54 integral with the trunnion portion 38 and extending downwardly therefrom, the cylindrical housing portion 54 housing an upper portion of the pivotable steering leg 34. More specifically, the housing portion 54 includes a central bore 56 housing a steering leg support casing 58 and a bearing housing 60. Both the steering leg support casing 58 and the bearing housing 60 are fixedly connected to the housing portion 54 of the movable housing 32. The bearing housing 60 includes, at its lower end, an annular inwardly extending flange 62 having a planar upper surface for supporting a bearing 64. The bearing 64 rotatably supports the pivotable steering leg 34 by supporting an annular flange 66 integral with and surrounding the pivotal steering leg 34.

Means are also provided for causing rotational steering movement of the pivotal steering leg 34. While various steering means can be provided, in the illustrated construction a steering control linkage 68 is connected to the propulsion leg 34, and includes a means (not shown) forward of the support 14 for causing rotation of the linkage and of the steering leg 34. More specifically, a gear 70 is fixed to the upper part of the rotatable steering leg 34 and is in mesh with a pinion 72 fixed to an end portion of a steering shaft 74 of the steering control linkage 68. The end of the steering shaft 74, supporting the pinion 72, is supported by a pair of bearings 71 in turn supported in a bearing housing 76 fixedly supported by the bearing housing 60. The opposite end of the steering shaft 74 is supported by a bearing 73, the bearing 73 being supported by a bracket 75 supported by the trunnion portion 38 of the movable housing 32. The steering control linkage 68 also includes a forwardly extending steering shaft portion 78 which is journaled in the stationary housing 20 in radially extending relation with respect to the tilt axis 30. The steering shaft portion 78 also extends through a slot 80 in the trunnion portion 38 of the movable housing 32, the slot 80 permitting rotational movement of the trunnion portion 38 of the housing 32 about the tilt axis 30 while the portion 78 of the steering shaft 68 remains fixed with respect to the stationary housing 20.

The portions 74 and 78 of the steering shaft 68 are connected by a universal joint 82, the intersection of the pivotal members 84 and 86 of the universal joint 82 intersecting at the tilt axis 30.

In operation of the steering control linkage 68, pivotal movement of the steering shaft portion 78 causes, through the universal coupling 82, consequent pivotal movement of the shaft portion 74. Such movement of the shaft 74 is translated to the pinion 72 thereby causing rotation of the gear 70 and the steering leg 34.

The stationary housing 20 and the movable housing 32, provide an enclosure or gear box which contains a power train extending from the engine (not shown) to the propeller 36 and the power train including a reversing transmission for controlling operation of the propeller. In addition, the enclosure defined by the stationary housing 20 and the movable housing 32 provides a fluid tight container for oil for lubricating the drive train which extends therethrough and which includes the reversing transmission.

Referring more specifically to the power train, the stationary housing 20 rotatably supports a power input shaft 88 which extends transversely to the tilt axis 30 and which is adapted to be driven in one rotational direction by an internal combustion engine (not shown). Rotatably mounted by bearings 90 and 92 which are supported in a central cylindrical bore 94 in an upwardly extending generally cylindrical portion 96 of the movable housing 32 is a drive or output shaft 98 which is adapted to be drivingly connected to the propeller 36 and which extends in transverse relation to the tilt axis 30 and is in substantially coplanar relation to the power input shaft 88.

Three bevel gears 100, 102 and 104 are mounted in coaxial relation with each other and for rotation about the tilt axis 30. A driven bevel gear 99 is integrally joined to the upper end of the output shaft 98 for driving the output shaft and is supported in meshing relation with the bevel gears 100 and 102 and is driven by those bevel gears. The bevel gear 104 comprises a relatively large transfer gear 104 in mesh with a drive gear 105 integrally attached to and rotatably driven by the drive shaft 88. The bevel gear 104 is rotatably supported on an inwardly projecting hollow shaft 106 of the plate 24. In the illustrated construction, the transfer gear 104 is also supported for rotation about the tilt axis 30 by bearings 120 and 122. The bearing 120 is supported by the inner cylindrical surface 23 of the stationary housing, and bearing 122 is supported by an external surface of an annular flange 124 extending inwardly from the end plate 24 of the stationary housing. The transfer gear 104 includes a first portion 108 rotatably supported by the shaft 106 for rotation about the shaft and a second portion 110 fixedly attached to the first portion 108 by a plurality of bolts 112. The first and second portions 108 and 110 of the transfer gear 104 define a stepped cylindrical cavity 114 therebetween for housing a pair of independent clutch packs 116 and 118 to be described more fully hereinafter.

Referring more specifically to the means for supporting the bevel gears 100 and 102, in the illustrated construction, a gear bearing housing 130 is fixedly housed within the central bore of the trunnion portion 38 of the movable housing 32 and supports bearings 132 and 134. The gear bearing housing 130 also supports a pair of bearing 136 and 138 in turn supporting the bevel gear 102. The gears 100 and 102 are thus supported for rotation about the tilt axis 30. One of the advantages of the construction illustrated is that the transfer gear 104 is rotatably supported by the housing 20 to insure accurate gear mesh between the gears 104 and 105, and the gears 100 and 102 are supported by the movable housing to ensure accurate gear mesh between gears 100, 102 and 99.

The reversing transmission 87 also includes a central rotatable transfer shaft 140 having a longitudinal axis or axis of rotation coincident with the tilt axis 30. One end of the transfer shaft 140 is splined and is housed in a central internally splined bore in the bevel gear 100 whereby rotation of the transfer shaft 140 will result in rotation of the bevel gear 100. The bevel gear 102 surrounds the transfer shaft 140 and is freely rotatable with respect to the transfer shaft.

Means are also provided for selectively and alternatively connecting the transfer gear 104 to the bevel gears 100 and 102, the connecting means including the clutch packs 116 and 118. The transfer shaft 140 includes, at its end opposite the bevel gear 100, an annular flange 142 having a diameter substantially larger than that of the shaft 140. The peripheral edge of the annular flange 142 supports a plurality of parallel spaced clutch discs 144 suitably supported by the flange 140 for rotation therewith and interleaved with a plurality of clutch discs 146 attached by pins 147 to the transfer gear for rotation with the transfer gear.

Means are also provided for forcing the clutch discs 144 and 146 into frictional engagement to thereby cause rotation of the transfer shaft 140 and the bevel gear 100 with the transfer gear 104. Such means includes a piston 148 housed within a cylinder 150 in the transfer gear 104, and engageable against the stacked discs 144 and 146 for forcing them into frictional engagement when pressurized fluid is forced through the port 152 into the cylinder 150. Engagement of the discs of the clutch pack 116 could also be effected by an alternative means such as an electrical, mechanical or alternative hydraulic structure.

In the illustrated construction, the clutch pack 118 is comprised of a plurality of clutch discs 154 suitably supported for rotation with the transfer gear 104 and a plurality of interleaved clutch discs 156 supported for rotation about the tilt axis 30 by a sleeve 158. The sleeve 158 surrounds a portion of the transfer shaft 140 and includes external splines received by integral splines in the bore 160 of the bevel gear 102 such that sleeve 158 and gear 102 rotate around the tilt axis 30 together. Means are also provided for selectively and alternatively causing frictional engagement of the clutch discs 154 and 156 whereby the transfer gear 104 will drive the sleeve 158 and the bevel gear 102. While various constructions can be provided, in the illustrated construction, such means include a piston 162 housed within a cylinder 164 in the transfer gear 104 and engageable with the stacked clutch discs 154 and 156 for forcing them together when fluid is forced into the cylinder 164 through passages 166 and 168. Engagement of the discs of the clutch pack 118 could also be effected by an alternative means such as an electrical, mechanical or alternative hydraulic structure.

The source of pressurized fluid is shown in the illustrated construction as comprising a fluid pump 170 housed in the stationary housing 20 and driven by rotation of the transfer gear 104. Pressurized fluid could also be provided by an alternate internal or external source.

Means are also provided for alternately and selectively providing flow of pressurized fluid from the fluid pump 170 to the ports 152 and 168. Such means comprises a 3-way valve 174 shown in FIG. 3. A fluid line 178 delivers pressurized fluid from the fluid pump 170 to the valve 174, and a fluid line 176 provides return of the fluid to the pump. When the valve 174 is in the position indicated, no fluid is conveyed to the cylinders 150 or 164. When the valve spool 184 is moved downwardly as viewed in FIG. 3, the fluid line 178 will convey fluid to fluid line 182 whereby pressurized fluid is delivered through port 152 to cause actuation of the piston 148. At the same time, the cylinder 164 will be placed in communication with the return fluid line through conduits 166, 168 and 180. When the valve spool is moved upwardly as seen in FIG. 3, the fluid line 178 will be placed in communication with fluid line 180 to provide pressurized fluid to cylinder 164 and communication of fluid line 182 with the return line 176.

In operation, the input shaft 88, drive gear 105 and transfer gear 104 are driven by the engine (not shown). Rotation of the transfer gear 104 drives pump 170. In the neutral mode, the pressurized fluid is not conveyed to either of the cylinders 150 or 164. Accordingly, the clutch discs 146 and 154 rotatable with the transfer gear are free to rotate with respect to the clutch discs 144 connected to annular flange 142 and the clutch discs 156 connected to the sleeve 158. If the valve 174 is then actuated to cause pressurized fluid to be delivered to the port 152 and to cylinder 150, the piston 148 will force the clutch discs 144 and 146 into engagement thereby causing the annular flange 142 and transfer shaft 140 to be driven with the transfer gear 104. The transfer shaft 140 in turn drives the bevel gear 100 causing rotation of driven bevel gear 99 and the shaft 98 in the first direction. If, on the other hand, the valve 174 is actuated to cause pressurized fluid to be delivered to the port 168 and the cylinder 164, the piston 162 will force the clutch discs 154 and 156 into frictional engagement whereby the transfer gear 104 will rotatably drive the sleeve 158 and bevel gear 102 splined on the sleeve 158. The bevel gear 102 will in turn drive the driven bevel gear 99 and the shaft 98 in the opposite rotational direction.

It should be recognized that in an alternative construction of the invention, the reversing transmission components could be reversed such that the transfer gear 104 would mesh with the driven bevel gear 99 and such that the bevel gears would be driven by the drive gear 105 and whereby the clutch packs would alternatively and selectively connect the driven bevel gears to the transfer gear to drive the transfer gear.

Various features of the invention are set forth in the following claims.

What is claimed is:

1. A stern drive unit comprising a stationary housing adapted to be fixed to a boat hull, a moveable housing, means mounting said moveable housing on said stationary housing for pivotal movement about a tilt axis which is substantially horizontal when said stationary housing is fixed relative to the boat hull, a power transfer shaft supported for rotation coaxially with respect to said tilt axis, a transfer gear therein a chamber including a first cylindrical chamber portion and a second cylindrical chamber portion, spaced opposed bevel gears mounted for rotation coaxially with said tilt axis, one of said bevel gears being mounted on said transfer shaft for common rotation therewith, and the other of said bevel gears being mounted for rotation coaxially with respect to said transfer shaft, means for alternatively and selectively connecting said transfer gear to said other of said bevel gears and to said transfer shaft for rotation therewith, and including a first clutch pack housed in said first cylindrical chamber portion for selectively connecting said transfer shaft to said transfer gear and a second clutch pack housed in said second cylindrical chamber portion for selectively connecting said one of said bevel gears to said transfer gear, an input shaft in said stationary housing and extending transversely to said transfer shaft, an output shaft journaled in said moveable housing and located in a plane perpendicular to said tilt axis, a first gear mounted on one of said input shaft and said output shaft and in mesh with said transfer gear, and a second gear mounted on the other of said input shaft and said output shaft and in mesh with both of said spaced bevel gears.

2. A stern drive unit as set forth in claim 1 wherein said first clutch pack includes at least one clutch plate supported for rotation about said tilt axis with said transfer gear and a second clutch plate mounted for rotation with said transfer shaft, said first and second clutch plates being located in adjacent relation, wherein said means for alternately and selectively connecting said transfer gear includes means for alternatively and selectively forcing said clutch plates into frictional engagement, wherein said second clutch pack includes at least one clutch plate supported for rotation about said tilt axis with said transfer gear and a second clutch plate mounted for rotation with said one of said bevel gears, said first and second clutch plates of said second clutch pack being located in adjacent relation, and wherein said means for alternately and selectively connecting said transfer gear includes means for forcing said first and second clutch plates of said second clutch pack into frictional engagement.

3. A stern drive unit as set forth in claim 2 wherein said means for forcing said clutch plates of said first clutch pack into frictional engagement includes a first fluid actuated piston housed in said first chamber portion, wherein said means for forcing said clutch plates of said second clutch pack into frictional engagement includes a second fluid actuated piston, and wherein said means for alternately and selectively connecting said transfer shaft further includes means for selectively and alternatively actuating said pistons.

4. A stern drive unit as set forth in claim 3 wherein said means for selectively and alternatively actuating said pistons includes a fluid pump supported by said support and driven by said transfer gear.

5. A stern drive unit as set forth in claim 1 wherein said stationary housing includes means for supporting said transfer gear for rotation, and wherein said movable housing further includes means for supporting said bevel gears for rotation about said tilt axis and in coaxial alignment with said transfer gear and including at least one bearing and a bearing housing, said bearing housing being supported by said moveable housing.

6. A stern drive unit comprising a stationary housing adapted to be fixed relative to a boat hull, a movable housing, means for mounting said movable housing on said stationary housing for pivotal movement about a tilt axis which is substantially horizontal when said stationary housing is fixed to the boat hull, a propulsion leg including a rotatably mounted propeller, an input shaft in said stationary housing and transverse to said tilt axis, an output shaft journaled in said movable housing and having an axis transverse to said tilt axis, and connected to said propeller, and a reversing transmission connected to said input and output shafts for selectively controlling operation of said propeller, said reversing transmission including a transfer gear supported for rotation coaxially with said tilt axis and including therein first and second cylindrical cavities, spaced bevel gears mounted for rotation coaxially with said transfer gear, means for alternatively and selectively connecting said transfer gear to said bevel gears for rotation with said transfer gear, said connecting means including a first clutch pack located in said first cylindrical cavity for selectively connecting and disconnecting said transfer gear to one of said bevel gears and a second clutch pack located in said second cylindrical cavity for selectively connecting and disconnecting said transfer gear to the other of said bevel gears, and first and second pistons respectively housed within said first and second cavities and respectively selectively engageable with said first and second clutch packs, a first gear mounted on one of said input shaft and said output shaft in mesh with said transfer gear, and a second gear mounted on the other of said input shaft and said output shaft and in mesh with both of said spaced bevel gears.

7. A stern drive unit comprising a stationary housing adapted to be fixed relative to a boat hull, a movable housing, means for mounting said movable housing on said stationary housing for pivotal movement about a tilt axis which is substantially horizontal when said stationary housing is fixed to the boat hull, a propulsion leg including a rotatably mounted propeller, an input shaft in said stationary housing and transverse to said tilt axis, an output shaft journaled in said movable housing and having an axis transverse to said tilt axis, and connected to said propeller, and a reversing transmission connected to said input and output shafts for selectively controlling operation of said propeller, said reversing transmission including a transfer shaft supported for rotation coaxially with said tilt axis by said housing, a transfer gear supported for rotation coaxially with said tilt axis, first and second spaced bevel gears mounted for rotation coaxially with said transfer gear, said first bevel gear being mounted on said transfer shaft for rotation with said transfer shaft, means for alternatively and selectively connecting said transfer gear to said bevel gears for rotation with said transfer gear, said connecting means including a first clutch pack for selectively connecting and disconnecting said transfer gear to said first bevel gear, said first clutch pack including at least one clutch plate mounted in said chamber for rotation about said axis with said transfer gear and a second clutch plate mounted on said transfer shaft for rotation with said transfer shaft, said first and second clutch plates being located in adjacent relation, said means for selectively and alternatively connecting said bevel gears to said transfer gear also including means for selectively forcing said clutch plates into engagement to effect rotation of said transfer shaft and said first bevel gear with said transfer gear, and a second clutch pack for selectively connecting and disconnecting said transfer gear to said second bevel gear, a first gear mounted on one of said input shaft and said output shaft in mesh with said transfer gear, and a second gear mounted on the other of said input shaft and said output shaft and in mesh with both of said spaced bevel gears.

8. A stern drive unit as set forth in claim 7 wherein the other of said bevel gears is rotatable with respect to said transfer shaft, and wherein said second clutch pack includes a first clutch plate supported by said transfer gear for rotation with said transfer gear and a second clutch plate connected to said second bevel gear for rotation with said second bevel gear, and wherein said means for selectively and alternatively connecting said bevel gears to said transfer gear includes means for selectively forcing said second clutch pack clutch plates into frictional engagement for causing rotation of said other bevel gear with said transfer gear.

9. A stern drive unit as set forth in claim 7 wherein said means for forcing said clutch plates into engagement include a fluid actuated piston engageable against one of said clutch plates for forcing said clutch plates together.

10. A stern unit comprising a stationary housing adapted to be fixed to a boat hull, a moveable housing, means mounting said moveable housing on said stationary housing for pivotal movement about a tilt axis which is substantially horizontal when said stationary housing is fixed relative to the boat hull, a power transfer shaft supported for rotation coaxially with respect to said tilt axis, a transfer gear supported for rotation about said tilt axis, spaced first and second opposed bevel gears mounted for rotation coaxially with said tilt axis, said first bevel gear being fixed on said transfer shaft for common rotation therewith, said second bevel gear being mounted for rotation coaxially with respect to said transfer shaft and independently of said transfer shaft and said transfer gear, means for alternatively and selectively connecting said transfer gear to said second bevel gear and to said transfer shaft for rotation therewith, an input shaft in said stationary housing and extending transversely to said transfer shaft, an output shaft journaled in said moveable housing and located in a plane perpendicular to said tilt axis, a first gear mounted on one of said input shaft and said output shaft and in mesh with said transfer gear, and a second gear mounted on the other of said input shaft and said output shaft in mesh with both of said spaced bevel gears.

11. A stern drive unit as set forth in claim 10 wherein said stationary housing includes a central bore supporting therein at least a portion of said moveable housing for pivotal movement about said tilt axis, and said portion of said moveable housing including therein a bore housing said bevel gears, and wherein said stern drive unit further includes first bearing means supported in said stationary housing central bore for supporting said transfer gear for rotation about said tilt axis, and second bearing means supported by said moveable housing base for supporting said bevel gears for rotation about said tilt axis.

12. A stern drive unit comprising a stationary housing adapted to be fixed relative to a boat hull and including a central bore, a movable housing including therein a bore, means for mounting said movable housing on said stationary housing for pivotal movement about a tilt axis which is substantially horizontal when said stationary housing is fixed to the boat hull, a propulsion leg including a rotatably mounted propeller, an input shaft in said stationary housing and transverse to said tilt axis, an output shaft journaled in said movable housing and having an axis transverse to said tilt axis, and connected to said propeller, and a reversing transmission connected to said input and output shafts for selectively controlling operation of said propeller, said reversing transmission including a transfer gear supported for rotation coaxially with said tilt axis, spaced bevel gears mounted for rotation coaxially with said transfer gear, means for alternatively and selectively connecting said transfer gear to said bevel gears for rotation with said transfer gear, said connecting means including a first clutch pack for selectively connecting and disconnecting said transfer gear to one of said bevel gears and a second clutch pack for selectively connecting and disconnecting said transfer gear to the other of said bevel gears, a first gear mounted on one of said input shaft and said output shaft in mesh with said transfer gear, a second gear mounted on the other of said input shaft and said output shaft and in mesh with both of said spaced bevel gears, first bearing means supported in said stationary housing central bore and supporting said transfer gear for rotation about said tilt axis, and second bearing means supported by said moveable housing in said moveable housing bore and supporting said bevel gears for rotation about said tilt axis.

13. A stern drive unit comprising a stationary housing adapted to be fixed relative to a boat hull, a movable housing, means for mounting said movable housing on said stationary housing for pivotal movement about a tilt axis which is substantially horizontal when said stationary housing is fixed to the boat hull, a propulsion leg including a rotatably mounted propeller, an input shaft in said stationary housing and transverse to said tilt axis, and output shaft journaled in said movable housing and having an axis transverse to said tilt axis, and connected to said propeller, a transfer gear supported for rotation coaxially with said tilt axis and independently of said transfer shaft, spaced first and second bevel gears mounted for rotation coaxially with said transfer gear, said first bevel gear being rotatable independently of said transfer shaft and said transfer gear, and said second bevel gear being fixed for common rotation with said transfer shaft, means for alternatively and selectively connecting said transfer gear to said bevel gears, said connecting means including a first clutch pack for selectively connecting and disconnecting said transfer gear to said first bevel gear and a second clutch pack for selectively connecting and disconnecting said transfer gear to said transfer shaft, a first gear mounted on one of said input shaft and said output shaft and in mesh with said transfer gear, and a second gear mounted on the other of said input shaft and said output shaft and in mesh with both of said spaced bevel gears.

14. A stern drive unit as set forth in claim 13 wherein said transfer gear includes a chamber therein and wherein said clutch packs are disposed in axially aligned relation with respect to said tilt axis in said chamber.

15. A stern drive unit as set forth in claim 13 and further including a fluid pump located in said stationary housing and driven by said transfer gear.

16. A stern drive unit as set forth in claim 13 wherein said stationary housing includes means for supporting said transfer gear for rotation about said tilt axis, and wherein said movable housing includes means for supporting said bevel gears for rotation in coaxial alignment with said transfer gear.

* * * * *